United States Patent [19]
Munir et al.

[11] Patent Number: 5,794,113
[45] Date of Patent: Aug. 11, 1998

[54] SIMULTANEOUS SYNTHESIS AND DENSIFICATION BY FIELD-ACTIVATED COMBUSTION

[75] Inventors: Zuhair Abdul Razzak Munir, Davis, Calif.; In-Jin Shon, Chonbuk, Rep. of Korea; Kazuo Yamazaki, El Macero, Calif.

[73] Assignee: The Regents of the University of California, Alameda, Calif.

[21] Appl. No.: 432,603

[22] Filed: May 1, 1995

[51] Int. Cl.$^6$ .................................................. B22F 3/14
[52] U.S. Cl. ..................... 419/45; 419/48; 419/51; 419/52
[58] Field of Search .................. 419/48, 51, 52, 419/45

[56] References Cited

U.S. PATENT DOCUMENTS

| | | | |
|---|---|---|---|
| 2,941,248 | 6/1960 | Hall | 18/16.5 |
| 2,947,611 | 8/1960 | Bundy | 23/209.01 |
| 4,946,643 | 8/1990 | Dunmead et al. | 419/12 |
| 4,999,144 | 3/1991 | Miyamoto et al. | 264/56 |
| 5,011,800 | 4/1991 | Abramovici et al. | 501/96 |
| 5,043,120 | 8/1991 | Corrigan | 264/67 |
| 5,110,768 | 5/1992 | Kaner et al. | 501/1 |
| 5,129,801 | 7/1992 | Rabin et al. | 425/1 |
| 5,134,260 | 7/1992 | Piehler et al. | 219/10.41 |
| 5,145,619 | 9/1992 | Abramovici | 264/60 |
| 5,158,828 | 10/1992 | Sudani et al. | 428/368 |
| 5,162,118 | 11/1992 | Niiler et al. | 425/1 |
| 5,178,691 | 1/1993 | Yamashita et al. | 148/101 |
| 5,188,678 | 2/1993 | Sekhar et al. | 148/514 |
| 5,196,264 | 3/1993 | Tsuchiya et al. | 428/328 |
| 5,227,235 | 7/1993 | Moro et al. | 428/357 |
| 5,256,368 | 10/1993 | Oden et al. | 419/10 |
| 5,314,656 | 5/1994 | Munir | 419/13 |
| 5,316,718 | 5/1994 | Sekhar | 419/19 |
| 5,320,988 | 6/1994 | Corrigan | 501/96 |
| 5,344,605 | 9/1994 | Kaji et al. | 419/31 |
| 5,348,800 | 9/1994 | Moro et al. | 428/328 |
| 5,380,409 | 1/1995 | Munir et al. | 204/130 |

OTHER PUBLICATIONS

A. K. Vasudevan and J. J. Petrovic, "A Comparative Overview of Molybdenum Disilicide Composites", *Mater. Sci. Eng.*, A155, (1992), pp. 1–17.

J. Milne, "Instant Heat", Kinetic Metals, Inc., Derby, Connecticut, 1985.

Y. S Touloukian, R. W. Powell, C. Y. Ho, and P. G. Klemens, Thermal conductivity, IFI/Plenum, New York–Washington (1970), p. 1324.

R. Wenrman, in "High–Materials and Technology", I. E. Campbell and E. M. Sherwood, Editors, Wiley, New York, (1967), pp. 399–430.

B. Aronsson, T. Lundstrom, and S. Rundquist, "Borides, Silicides, and Phosphides", Wiley, New York, (1965), pp. 1–7.

J. D. Cotton, Y. S. Kim, and M. J. Kaufman, "Intrinsic Second–Phase Particles in Powder Processed $MoSi_2$", *Mater. Sci. Eng.*, A144, (1991), pp. 287–291.

L. Wang, M. R. Wixom, and L. T. Thompson, "Structural and Mechanical Properties of $TiB_2$ and TiC Prepared by Self–Propagating High–Temperature Synthesis/Dynamic Compaction", *J. Mater. Sci.*, 29, (1994), pp. 534–543.

L. J. Kecskes, R. F. Benck, and P. H. Netherwood, "Dynamic Compaction of Combustion–Synthesized Hafnium Carbide", *J. Am. Ceram. Soc.*, 73, (1990), pp. 383–387.

(List continued on next page.)

*Primary Examiner*—Daniel J. Jenkins
*Attorney, Agent, or Firm*—Fulbright & Jaworski, L.L.P.

[57] ABSTRACT

A method for preparing a highly dense product from a powdered mixture of reactants, whereby simultaneous application of a high current and pressure enables synthesis and densification of a variety of high temperature materials. The combination of field-activated combustion synthesis and the application of mechanical pressure was employed to produce dense $MoSi_2$.

9 Claims, 3 Drawing Sheets

OTHER PUBLICATIONS

S. Gedevanishvili and Z. A. Munir, "Field–Assisted Combustion Synthesis of $MoSi_2$–SiC Composites", *Scripta Metall. Mater.*, 31, (1994), pp. 741–743.

M. I. Mendelson, "Average Grain Size in Polycrystalline Ceramics", *J. Amer. Ceram. Soc.*, 52, (1969), pp. 443–446.

R. K. Wade and J. J. Petrovic, "Fracture Modes in $MoSi_2$", *J. Am. Ceram. Soc.*, 75, (1992), pp. 1682–1684.

A. Feng and Z. A. Munir, "Field–Assisted Self–Propagating Synthesis of β–SiC", *J. Appl. Phys.*, 76, (1994), pp. 1927–1928.

R. Gibala, A. K. Ghosh, D. C. Van Alken, D. J. Srolovitz, A. Basu, H. Chang, D. P. Mason, and W. Yang, "Mechanical Behavior and Interface Design of $MoSi_2$–Based Alloys and Composite", *Mater. Sci. Eng.*, A155 (1992), pp. 147–158.

Z. A. Munir, "Analysis of the Origin of Porosity in Combustion Synthesized Materials", *J. Mater. Synth. Process.*, 1, (1993), pp. 387–394.

O. Knacke, O. Kubaschewski, and K. Hesselmann, "Thermochemical Properties of Inorganic Substances", Springer–Verlag, Heidelberg (1991), p. 1287.

N. I. Kidin and I. A. Filimonov, "An SHS Process in An External Electric Field", *Int. J. SHS*, 1, (1992), pp. 513–519.

A. K. Bhattacharya and J. J. Petrovic, "Hardness and Fracture Toughness of SiC–Particle–Reinforced $MoSi_2$ Composite", *J. Am. Ceram. Soc.*, 74, (1994), pp. 2700–2703.

SIMULTANEOUS SYNTHESIS AND DENSIFICATION BY FIELD-ACTIVATED COMBUSTION

This invention was made with Government support under Grant No. CTS-93-01924, awarded by the National Science Foundation. The Government has certain rights in this invention.

BACKGROUND OF THE INVENTION

The present invention relates generally to the fields of chemistry and materials science. More particularly, the present invention relates to methods and compositions for use in the preparation of highly-dense materials.

There remains a long-felt need for final products having relatively high densities and methods for the preparation thereof. For example, the intermetallic compound $MoSi_2$ has recently received considerable attention as an attractive material for high temperature applications. Its properties provide a desirable combination of a high melting temperature (2293K), high modulus (440 GPa), high oxidation resistance in air and a relatively low density (6.25 g/cm$^3$) [A. K. Vasudevan and J. J. Petrovic, "A Comparative Overview of Molybdenum Disilicide Composites", *Mater. Sci. Eng.*, A155, (1992), p. 1–17]. Combined with good thermal and electric conductivities, these properties have led to the application of $MoSi_2$ in high-temperature heating elements [J. Milne, "Instant Heat", Kinetic Metals, Inc., Derby, Conn., 1985; Y. S Touloukian, R. W. Powell, C. Y. Ho, and P. G. Klemens, Thermal conductivity, IFI/Plenum, New York-Washington (1970), p. 1324].

Like many other high temperature compounds, dense $MoSi_2$ has heretofore usually been prepared in a multi-step process [R. Wenrman, in "High-Materials and Technology", I. E. Campbell and E. M. Sherwood, Editors, Wiley, N.Y., (1967), p. 399–430.; B. Aronsson, T. Lundstrom, and S. Rundquist, "Borides, Silicides, and Phosphides", Wiley, N.Y., (1965), p. 1–7; J. D. Cotton, Y. S. Kim, and M. J. Kaufman, "Intrinsic Second-Phase Particles in Powder Processed $MoSi_2$ ", *Mater. Sci. Eng.*, A144, (1991), p. 287–291]. The process begins by synthesizing $MoSi_2$, usually by reacting mixed stoichiometric powders of Mo and Si at high temperature for a relatively long time or by arc-melting bulk Mo and Si. The second step involves the crushing and milling of the hard product to produce fine powders. Finally, the powders are sintered at high temperatures (typically at 1700° C. for 1 hr) under a pressure to obtain dense $MoSi_2$ (with a typical relative density of 97%). Such a multi-stage process inherently has significant disadvantages, including the high energy requirement and the undesirable grain growth in the material components.

One of the currently used methods to synthesize high temperature materials is combustion synthesis. In this method, reactant powders are mixed and pressed to form a compact which is then "ignited" to initiate a combustion reaction. While this method has the advantage of energy savings, its primary disadvantage is the relatively high porosity of the resulting product material. In order to obtain useful materials, the products of combustion synthesis must be subsequently densified.

The use of pressure to produce dense materials during combustion synthesis has been demonstrated previously, using dynamic compaction methods [L. Wang, M. R. Wixom, and L. T. Thompson, "Structural and Mechanical Properties of $TiB_2$ and TiC Prepared by Self-Propagating High-Temperature Synthesis/Dynamic Compaction", *J. Mater. Sci.*, 29, (1994), p. 534–543; L. J. Kecskes, R. F. Benck, and P. H. Netherwood, "Dynamic Compaction of Combustion-Synthesized Hafnium Carbide", *J. Am. Ceram. Soc.*, 73, (1990), p. 383–387]. Dynamic compaction and other similar methods are limited to systems which are energetically favorable to synthesis by combustion, i.e. those systems with high adiabatic temperatures. Other systems, with low adiabatic temperatures cannot be synthesized and densified by the above methods. Such systems must be activated.

Field-activated combustion synthesis (FACS) has recently been used to synthesize a variety of ceramics and composites, including $MoSi_2$-SiC, SiC, and others [S. Gedevanishvili and Z. A. Munir, "Field-Assisted Combustion Synthesis of $MoSi_2$-SiC Composites", *Scripta Metall. Mater.*, 31, (1994), p. 741–743; A. Feng and Z. A. Munir, "Field-Assisted Self-Propagating Synthesis of β-SiC", *J. Appl. Phys.*, 76, (1994), p. 1927–1928; Z. A. Munir, W. Lai, and K. Ewald, U.S. Pat. No. 5,380,409, issued Jan. 10, 1995]. Products prepared according to this method are characterized by low adiabatic combustion temperatures and thus cannot be synthesized directly by self-propagating high-temperature synthesis (SHS).

It is an object of the present invention to provide methods and products which do not suffer from all of the drawbacks of the prior art methods.

SUMMARY OF THE INVENTION

Pursuant to the present invention, there is provided a method for preparing a highly dense product from a powdered mixture of reactants, whereby products having high densities are routinely provided. Simultaneous application of a high current and pressure enables synthesis and densification of a variety of high temperature materials. The combination of field-activated combustion synthesis and the application of mechanical pressure was employed to produce dense $MoSi_2$.

BRIEF DESCRIPTION OF THE DRAWINGS

The invention may be better understood with reference to the accompanying drawings, in which.

DETAILED DESCRIPTION OF THE INVENTION

In accordance with the present invention, a high current and pressure are simultaneously employed to synthesize and densify a suitable precursor. In this manner, a wide variety of high temperature products may efficiently and reproducibly be prepared.

In previous work in which combustion synthesis was coupled with densification, the processes are sequential (i.e. the densification process was effected after the combustion reaction has taken place). In this regard, the previous work represent the two steps of synthesis and hot-pressing.

For purposes of the present invention, a highly dense product is one having a relative density of 95% or higher. The present invention has particular advantage in the preparation of very high density products (i.e., greater than about 90% relative density), especially from precursor materials which have heretofore been difficult or impossible to process into acceptable products using the previously available techniques.

Suitable reactants (e.g., metallic and non-metallic elements and compounds) for use in preparation of products by methods in accordance with the present invention would be readily identified by those working in the field. In general, the properties of suitable precursor green bodies and of the constituents thereof are as described in detail in the aforementioned U.S. Pat. No. 5,380,409, the entire disclosure of which is hereby incorporated by reference. For example, pulverulent constituents of a suitable precursor green body suitably have a particle size in the range of about 3 μm to about 200 μm, more preferably about 4 μm to about 50 μm, and most preferably about 10 μm to about 15 μm. Similarly, while the relative density of the green body is not absolutely critical and different precursor compositions have different requirements which are readily determined empirically, in general the green body should have a relative density on the order of about 40% to about 70%, more preferably about 45% to about 65%, of theoretical full density.

Figure 1:
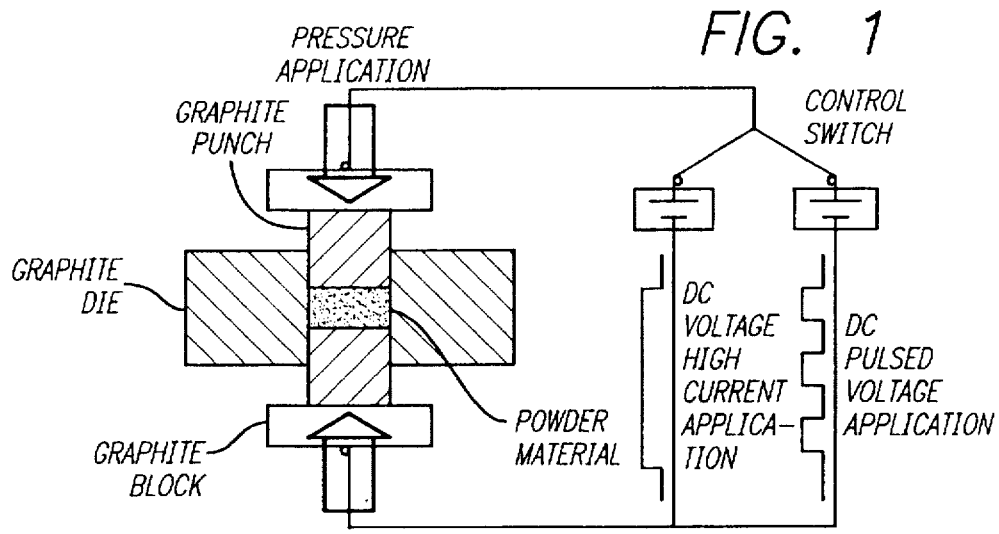
FIG. 1 is a schematic diagram of field-activated and pressure-assisted (FAPA) combustion synthesis and densification.

Pursuant to the method of the present invention, the green body is subjected to a high current applied across the sample (e.g., perpendicular or parallel to the major axis of the green body). The current is sufficient to cause Joule heating and may be readily determined empirically from the electrical resistance of the sample. Joule (resistance) heating raises the temperature of the sample to the ignition temperature, $T_i$, which can be calculated from the following:

$$T_i = T_o + \frac{V^2}{C_p R m} \cdot \tau$$

where $T_o$ is the ambient temperature, V is the applied voltage across the sample, $C_p$ is the heat capacity of the sample, R is its resistance, m is its mass, and τ is the duration of the application of the field. Current levels on the order of about 1500A to about 4000A are suitably employed. The current may suitably be applied to the precursor green body by applying a potential across the sample between two electrodes of conventional design, for example graphite electrodes, which also act as the die punches as seen in FIG. 1. Application of current is continued until the maximum operating temperature is reached. The maximum temperature for purposes of the present invention should at a minimum be the ignition temperature of the reaction, which in the case of the synthesis of molybdenum silicide coincides with the melting point of silicon.

Simultaneously, pressure is applied to the green body. The combination of current and pressure results in simultaneous synthesis and densification of the precursor green body to form highly dense final products having desirable properties. The applied pressure is sufficient to densify the product and may be readily determined empirically. Pressures on the order of about 10 MPa to about 100 MPa are suitably employed. The pressure may suitably be applied to the precursor green body in a manner known per se, for example as is conventional in pressure sintering procedures. Preferably, the apparatus in which the precursor green body is subjected to pressure and application of current is evacuated prior to initiation of simultaneous synthesis and densification; vacuum levels on the order of about 0.01 torr to about 1 torr are suitably employed.

In a particularly preferred embodiment of the invention, the simultaneous synthesis and densification is carried out in plasma-assisted sintering apparatus. This type of equipment was originally designed and built for the purpose of densifying materials only; it has been claimed that a plasma is created prior to densification at high temperature and pressure. The claim concerning the plasma, however, is debatable and there is currently no proof that a plasma is created. Thus the present equipment has been used as a hot-press through which a current is passed, primarily through the graphite die containing the powder. This causes the resistance heating of the die and the subsequent heating of its contents. Pressure is applied during this stage to effect densification (sintering).

In one preferred embodiment of the present invention, the process may be described as comprising the following stages: the application of a pressure on the reactants, preferably under vacuum conditions; the imposition of an electric current in a pulsed mode; the imposition of a current continuously until the maximum temperature is reached; and the cooling of the product at a constant rate. For some precursor green bodies, such a process provides optimal products.

In accordance with this embodiment of the invention, unreacted powders are placed inside a graphite die and the system is evacuated. Current is then pulsed (e.g., on and off for 30 ms) for a duration of time (e.g., 30 seconds). This is followed by the application of pressure and imposition of a high current through the die walls and through the sample powders inside it. The current raises the temperature of the sample through Joule heating, causing a reaction to occur at the ignition temperature. The simultaneous action of the pressure and reaction between powders results in a highly dense product.

Imposition of an electric current in a pulsed mode prior to heating and application of pressure to the precursor green body may in some instances result in purification of powder particle surfaces. While it was shown that the application of the pulsed current had little or no effect on the final density of the silicide in the exemplary syntheses described in detail herein for purposes of illustration, in other cases using other precursors application of a pulsed current may be advantageous.

In the exemplary syntheses of $MoSi_2$, the heating rate was observed to have a small effect. A lower heating rate produced products with slightly higher densities. Heating rates on the order of about 100° C./min to about 5000° C./min are suitably employed.

Finally, cooling of the product is effected at a substantially constant rate. In general, cooling is effected by simply discontinuing application of heat. Cooling rates on the order of about 100° C./min to about 1000° C./min are suitably employed.

The present invention is useful in the preparation of compounds (e.g., ceramics), composites (e.g., cermets and ceramic/ceramic composites) and intermetallics (e.g., alloys). For example, the invention has utility in the preparation of various borides, carbides and suicides, such as transition metal (e.g., titanium, vanadium, zirconium, niobium, molybdenum, hafnium, tungsten, tantalum, etc.) borides and suicides and carbides of, e.g., boron, silicon and transition metals. Particular compositions of interest include, but are not limited to, the following: binary compounds, such as SiC, B$_4$C, WC, MoB, MoB$_2$, TaSi$_2$, Al$_4$C$_3$, W$_2$B$_5$, WSi, Mo$_3$Si, MoSi$_2$ and NbSi$_2$; intermetallic compounds (such as, for example, aluminides of nickel, cobalt, copper, iron, molybdenum, niobium, titanium and zirconium, and alloys of titanium with nickel, cobalt and iron); and composites, such as composites of x SiC/MoSi$_2$ (x=4–8) and Al$_2$O$_3$/SiC.

In accordance with one particularly preferred embodiment of the present invention, a method to simultaneously synthesize and consolidate MoSi$_2$ from powders of Mo and Si was investigated. Combustion synthesis was carried out under the combined effect of an electric field and mechanical pressure. At a maximum temperature of 1400° C., no reaction between Mo and Si powders takes place; at 1700° C., MoSi$_2$ forms and densifies to as high a relative density as 99.2% in one step from elemental powders. Minor amounts of Mo$_5$Si$_3$ were present at the boundaries of MoSi$_2$ grains in the interior of samples made from stoichiometric reactants. The addition of 2.5 mol % Si excess, however, resulted in Mo$_5$Si$_3$-free, dense MoSi$_2$ products.

When powders with a Mo/2.00 Si stoichiometric ratio were used, the product contained small amounts of Mo$_5$Si$_3$ at the grain boundaries of MoSi$_2$ in the interior regions of the sample. Using a slight excess of Si resulted in a product that was free of the phase Mo$_5$Si$_3$ but had small amounts of Si or SiO$_2$ near the surface of the sample.

The invention may be better understood with reference to the accompanying example, which is intended for purposes of illustration only and should not be construed as in any sense limiting the scope of the invention as defined in the claims appended hereto.

EXAMPLE

The materials used in this example were 99.95% pure molybdenum powder with a particle size range 4–8 μm (Aldrich Chemical Company, Milwaukee, Wis.), and 99.5% pure silicon powder with a sieve classification of –325 (<44 μm) obtained from Alfa Products (Danvers, Mass.).

Figure 2:
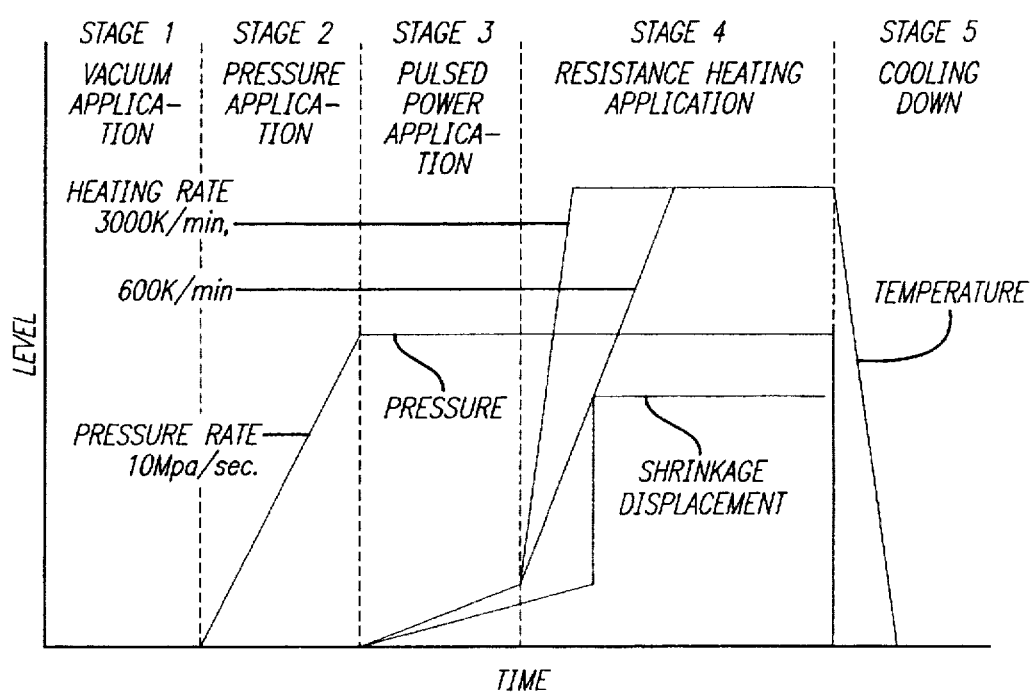
FIG. 2 is a schematic representation of the five stages of FAPA combustion synthesis and densification.

A schematic of the experimental setup of the field-activated and pressure-assisted (FAPA) combustion is shown in FIG. 1, and the five major stages in the synthesis as described in this example are shown in FIG. 2. Mixed powders (10 g) of Mo and 2Si were placed in a graphite die (outside diameter: 45 mm; inside diameter: 20 mm; height: 40 mm) and the system was evacuated (stage 1). This is followed by the application of pressure up to 30 MPa or 60 MPa at a rate of about 10 MPa/s (stage 2). A pulse discharge of 750 A(at 30V) for 30 ms on-off cycles was then applied for a total duration of 30 s (stage 3). The intended purpose of this stage is the removal of entrapped gases and the cleansing of the surface of the powder particles. The power was then switched from the pulse-power source to the constant resistance heating source (see FIG. 1). The powder mixture is thus heated until densification is attained as indicated by a linear gauge measuring the shrinkage of the sample (stage 4). Finally, the sample is cooled to room temperature at a given rate (stage 5). Typical parameters for field-activated and pressure-assisted combustion are presented in Table 1.

The relative density of the synthesized sample was measured using Archimedes method. To reduce the thermal stress of the products, each sample was heat-treated at 1100° C. for 1 hour and then cooled down to room temperature at a rate of 10° C./min. To obtain microstructural information, the product samples were polished and etched using a solution of HF(10 vol %), HNO$_3$(20 vol %), and H$_2$O(70 vol %). The grain size was determined from the micrographs using the linear-intercept technique [M. I. Mendelson, "Average Grain Size in Polycrystalline Ceramics", J. Amer. Ceram. Soc., 52, (1969), p. 443–446]. Analysis of the products was made through X-ray diffraction, and microstructural and chemical analyses were made by scanning electron microscopy with EDAX and by electron microprobe. Vickers microhardness measurements (under 400 g force) were made on the synthesized MoSi$_2$ samples.

The densified MoSi$_2$ specimens were discs of 20 mm diameter and about 5 mm height. The relative densities of the consolidated specimens are presented in Table 2 along with the details of the processing parameters employed. Five of the samples listed in Table 2 are for the Mo/2.00 Si stoichiometry (samples 1 through 5). Sample 6 has a stoichiometry of Mo/2.10 Si and samples 7 and 8 have a Mo/2.05 Si stoichiometry. Other differences relate to the magnitude of the applied pressure, the heating rate, the maximum temperature, and the duration of the pulsing stage, when used, as indicated in Table 2.

Figure 3:
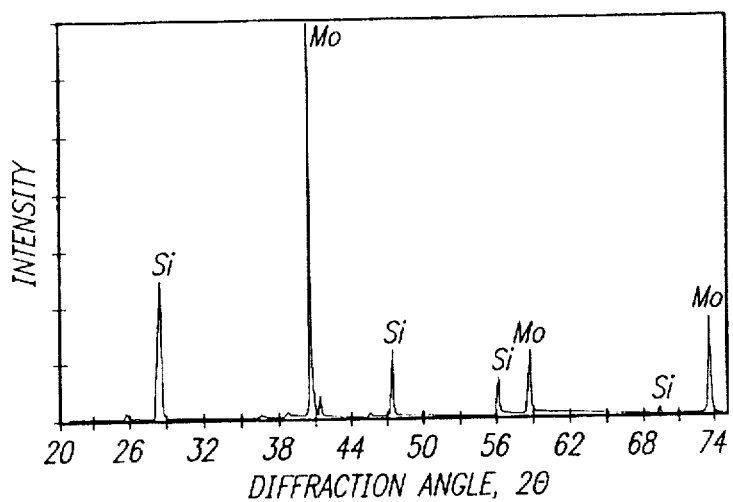
FIG. 3 is an X-ray diffraction pattern of product of sample 1 heated to 1400° C.
Figure 4:
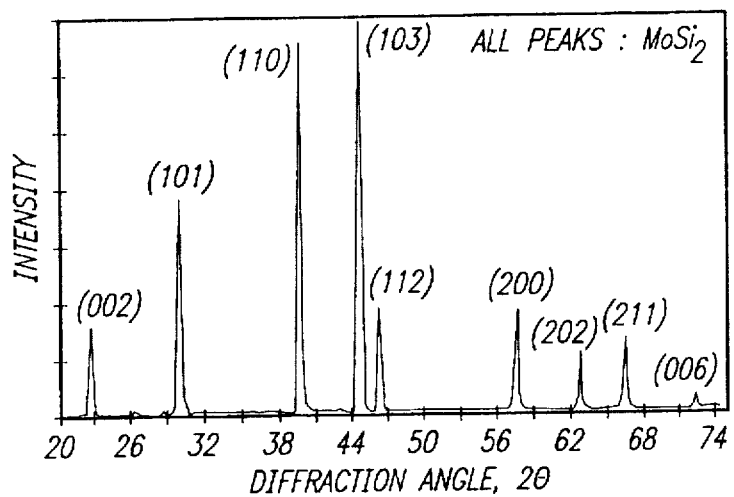
FIG. 4 is an X-ray diffraction pattern of product of sample 4 (Mo+2.00 Si) heated to 1700° C.

When a stoichiometric Mo/2.00 Si mixture is heated under 60 MPa pressure to 1400° C. (sample 1), no reaction takes place as judged by subsequent analysis. Back-scattered electron images and X-ray mapping of this sample (heated to 1400° C. with 2200A of resistance heating current) contained a white phase identified as Mo and a gray phase identified as Si, as was ascertained from X-ray mapping diagrams for Mo and Si, respectively. Results of X-ray diffraction analysis (FIG. 3) confirmed that a reaction between Mo and Si did not take place under these conditions. However, as can be seen in Table 2, when the maximum temperature is raised to 1700° C., the starting powders react to produce highly dense products. Increasing the pressure from 30 to 60 MPa resulted in only a small increase in the final density (samples 2 and 3). However, when the heating rate (in stage 4) is reduced from 3000° to 600° C./min, the density of the product is increased, reaching that of a nearly fully-dense MoSi$_2$ (sample 4). The relative density (99.2%) is higher than reported values (95–97%) for samples made by conventional hot-pressing of MoSi$_2$ powders [R. K. Wade and J. J. Petrovic, "Fracture Modes in MoSi$_2$", J. Am. Ceram. Soc., 75, (1992), p. 1682–1684; R. Gibala, A. K. Ghosh, D. C. Van Alken, D. J. Srolovitz, A. Basu, H. Chang, D. P. Mason, and W. Yang, "Mechanical Behavior and Interface Design of MoSi$_2$-Based Alloys and Composites", Mater. Sci Eng., A155 (1992), p. 147–158]. Back-scattered electron images of this sample (sample 4) were obtained for a region near the top (outside) of the sample and for a region near the center (inside) of the sample. The former showed the presence of only MoSi$_2$ with nearly equiaxed grains of about 15 μm in diameter. In contrast, the region near the center of the sample contained Mo$_5$Si$_3$ as a minor phase, situated typically at the triple points of the grain boundaries of MoSi$_2$. The presence of Mo$_5$Si$_3$ only in the interior of the sample suggests a deficiency of Si. A closer examination of this region showed that SiO$_2$ also exists as a minor phase. A dark region with an appearance of pores was determined to be SiO$_2$ as was confirmed by X-ray mapping for Si, Mo and O, respectively. The presence of SiO$_2$ in the center region and not in the region near the surface is not clearly understood. It is believed, however, that this observation is related to entrapped oxygen in the pores of the interior portion of the sample. It should be noted, however, that the amounts of both the Mo$_5$Si$_3$ and SiO$_2$ phase are relatively low and could not be discerned from X-ray diffraction, as seen in FIG. 4.

In order to eliminate the Mo$_5$Si$_3$ phase, hyperstoichiometric amounts of Si were included in the starting mixtures.

Figure 5:
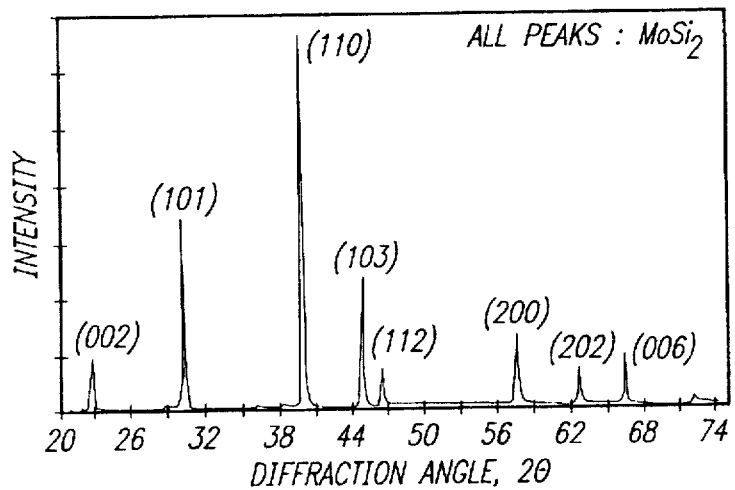
FIG. 5 is an X-ray diffraction pattern of sample 7 (Mo+2.05 Si)

Samples with Mo/2.05 Si and Mo/2.10 Si atomic ratios were investigated (samples 7, 8, and 6 in Table 2). For the case of the samples with 2.05 Si, the results show that $Mo_5Si_3$ is no longer present in the interior of the sample. However, traces of Si were detected in regions near the surface. Dark spots in the back-scattered electron images for both regions are likely to be pores or $SiO_2$. X-ray diffraction analysis of this sample did not reveal peaks belonging to either Si or $SiO_2$ (FIG. 5). As the amount of Si in the reactant mixture is further increased to an atomic ration of Mo/2.10 Si, the product showed the presence of excess Si in both the surface and interior regions.

Figure 6A:
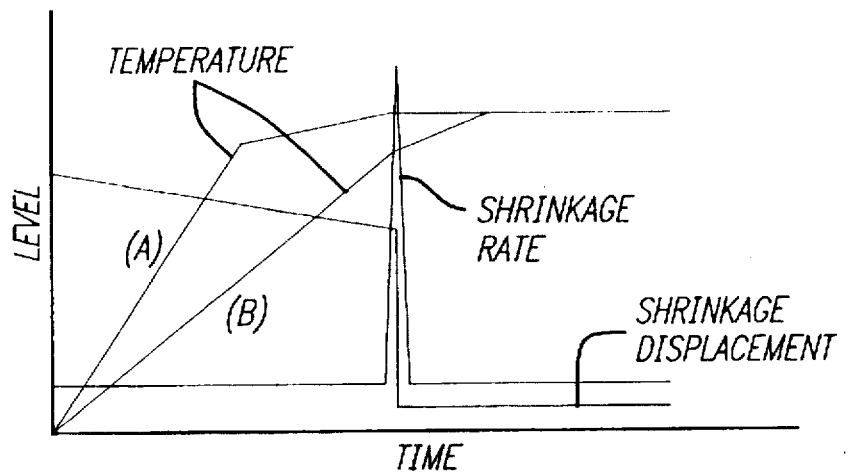
FIGS. 6A and 6B are schematic representations of the temperature profile (FIG. 6A) and shrinkage rate and shrinkage displacement (FIG. 6B) during FAPA synthesis and densification of $MoSi_2$.
Figure 6B:
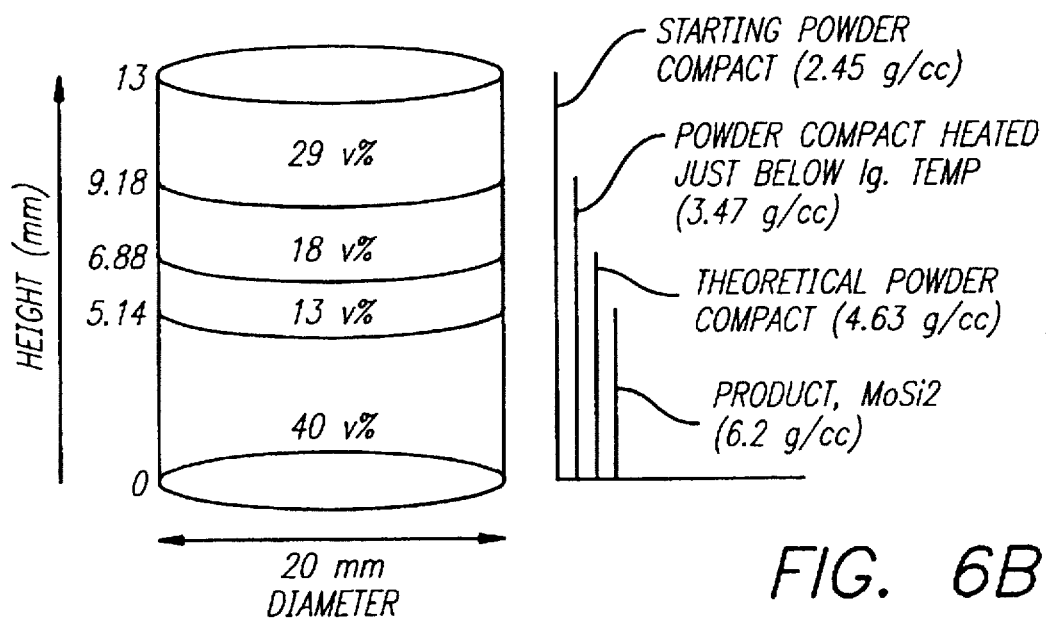

FIGS. 6A and 6B are schematic representations of shrinkage displacement, shrinkage rate and temperature profiles (FIG. 6A) and volume change during the processing of Mo+2 Si (FIG. 6B). Shrinkage rate and displacement abruptly increase at the ignition temperature of Mo+2 Si due to the increase in density as a result of molar volume change associated with the formation of $MoSi_2$ [Z. A. Munir, "Analysis of the Origin of Porosity in Combustion Synthesized Materials", *J. Mater. Synth. Process.*, 1, (1993), p. 387–394] and the consolidation of the product. Table 3 shows the densities, sample volumes, and volume changes at different stages in the synthesis and densification of $MoSi_2$. The data in the second column of Table 3 (before ignition) were obtained from sample 1 (refer to Table 2). These results show that about half of the total volume shrinkage occurs prior to ignition (29.4%) and about half (31.1%) occurs during synthesis and additional densification.

FIG. 6A shows two temperature profiles, one obtained at a heating rate of 3000° C./min (curve A) and the other at a rate of 600° C./min (curve B). In the former, heating is accomplished by the passage of a 3000A current throughout the process. In the latter the heating current is increased slowly to the ignition temperature and then the current is increased to the maximum value, 3000A. It is important to note that the temperature curve associated with the higher rate of heating (curve A) has a change of slope at the ignition temperature. Because of the relatively high resistance of the reactants (Mo+2 Si), the current flow prior to ignition is confined primarily to the graphite die. Once a reaction is initiated (triggered by the melting of Si) the conductivity of the sample improves and the rate of heating of the die decreases as evidenced by the decrease in the slope of the temperature curve (A). The measured temperatures are based on the pyrometric observations on the surface of the graphite die. The chemical heat released by the formation of $MoSi_2$, 24 kJ/mol, [O. Knacke, O. Kubaschewski, and K. Hesselmann, "Thermochemical Properties of Inorganic Substances", Springer-Verlag, Heidelberg (1991), p. 1287] and the larger electric energy through the sample, about 200 kW, lead to the expectation that the temperature of the sample exceeds the melting point of $MoSi_2$, 2030° C.

The inclusion of a pulsed power in the pre-synthesis of $MoSi_2$ (stage 3 in FIG. 2) was based on the belief that such a treatment results in the purification of the powder particle surface [N. L. Kidin and I. A. Filimonov, "An SHS Process in An External Electric Field", *Int. J. SHS*, 1, (1992), p. 513–519]. In this work the results show only a small difference between the densities of samples subjected to the pulse treatment and those for which this stage was eliminated (samples 4 and 5 in Table 2), 99.2 vs 97%, respectively. The microstructure of sample 5 (prepared without pulsing) was examined at parts representing regions near the surface and in the interior of the sample. No significant difference was observed between these microstructures and the corresponding ones for sample 4 (prepared with pulsing).

Vickers microhardness measurements were made on pulsed and non-pulsed, stoichiometric and hyper-stoichiometric samples. Samples 4 and 5 (atomic ratio: Mo/2.00 Si) were prepared with and without the pulsing stage, respectively. Samples 7 and 8 were likewise prepared, respectively, but with a stoichiometric ratio of Mo/2.05 Si. Hardness measurements on these samples are shown in Table 4. These values show that the differences in pre-reaction treatment and stoichiometry had no significant effect on the measured hardness. No cracks were observed at the micro-indentation corners of all these samples.

Literature values for the hardness of $MoSi_2$ compare well with the present results. Values of 9.4 and 9.3 GPa have been reported [Wade & Petrovic (1992), *supra*; A. K. Bhattacharya and J. J. Petrovic, "Hardness and Fracture Toughness of SiC-Particle-Reinforced $MoSi_2$ Composite", *J. Am. Ceram. Soc.*, 74, (1994), p. 2700–2703].

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and any specific terms employed herein are intended in a descriptive sense and not for purposes of limitation.

TABLE 1

Processing Parameters for Field-Activated and Pressure-Assisted Combustion Synthesis of $MoSi_2$

| Parameter | Value |
| --- | --- |
| Vacuum Level | 0.07 torr (9.33 Pa) |
| Applied Pressure | 30 MPa, 60 MPa |
| Pulsed Discharge | |
| Voltage | 30 V |
| Current | 750 A |
| On-off Durations | 30 ms |
| Total Duration | 30 s |
| Resistance Heating | |
| Voltage | 75 V |
| Current | 2200 A, 3000 A |
| Duration | 3–6 min |
| Heating Rate | 600° C./min, 3000° C./min |
| Maximum Temperature | 1700° C. |
| Cooling Rate | 600° C./min |

TABLE 2

Summary of the Experimental Condition and Density

| Sample Stoichiometry (No.) | Pulsing Duration (s) | Applied Pressure (MPa) | Heating Rate (°C./min) | Maximum Temperature (°C.) | Relative Density (%) |
| --- | --- | --- | --- | --- | --- |
| Mo +2Si (1) | 30 | 60 | 600 | 1400 | No Combustion |
| Mo + 2Si (2) | 30 | 30 | 3000 | 1700 | 94.5 ± 1 |
| Mo + 2Si (3) | 30 | 60 | 3000 | 1700 | 96 ± 0.6 |
| Mo + 2Si (4) | 30 | 60 | 600 | 1700 | 99.2 ± 0.4 |
| Mo + 2Si (5) | 0 | 60 | 600 | 1700 | 97 ± 0.6 |
| Mo + 2.1Si (6) | 0 | 60 | 3000 | 1700 | 95.5 ± 0.6 |
| Mo + 2.05Si (7) | 30 | 60 | 600 | 1700 | 98.5 ± 0.5 |
| Mo + 2.05Si (8) | 0 | 60 | 600 | 1700 | 97.5 ± 0.5 |

TABLE 3

Density, Volume, and Volume Changes During Field-Activated and Pressure-Assisted (FAPA) Synthesis of $MoSi_2$

|  | Initial Sample | Before Ignition | Reactants (theor) | Product (expt) | Product (theo) |
| --- | --- | --- | --- | --- | --- |
| Density (g/cm$^3$) | 2.45 | 3.47 | 4.64 | 6.20 | 6.25 |
| Sample Volume (cm$^3$) | 4.08 | 2.88 | 2.16 | 1.61 | 1.60 |
| Pore Volume (cm$^3$) | 1.92 | 0.72 | 0.0 | 0.006 | 0.0 |
| Volume Change (%) | 0.0 | 29.4 | 47.1 | 60.5 | 60.8 |
| Incremental Volume Change (%) | 0.0 | 29.4 | 17.7 | 13.4 | 0.3 |

TABLE 4

Vickers Hardness of $MoSi_2$ Synthesized by the Field-Activated and Pressure-Assisted (FAPA) Method (Indentation Load: 400 g)

| Sample (No.) Stoichiometry | Pulsing | Vickers Hardness Hv (GPa) |
| --- | --- | --- |
| Mo + 2 Si (4) | Active | 9.6 |
| Mo + Si (5) | Inactive | 9.4 |
| Mo + 2.01 Si (7) | Active | 9.5 |
| Mo + 2.01 Si (8) | Inactive | 9.4 |

What is claimed is:

1. A method of preparing a dense product, comprising:

applying a current effective to cause Joule heating of a green body to ignition temperature; and simultaneously applying to the green body a pressure effective to synthesize a product from reactants in the green body and densify the product.

2. A method according to claim 1, wherein a current level on the order of about 1500A to about 4000A is employed.

3. A method according to claim 1, wherein a pressure of about 10 MPa to about 100 MPa is employed.

4. A method according to claim 1, wherein a first electric current is applied in a pulsed mode, followed by imposition of a second current in a continuous mode until maximum temperature is reached.

5. A method according to claim 1, further comprising cooling the product at a constant rate.

6. A method according to claim 1, wherein the product is selected from the group consisting of compounds, composites and intermetallics.

7. A method according to claim 6, wherein the product is selected from the group consisting of borides, carbides and suicides.

8. A method according to claim 7, wherein the product is $MoSi_2$.

9. A product when prepared according to the method of claim 1.

* * * * *

UNITED STATES PATENT AND TRADEMARK OFFICE
CERTIFICATE OF CORRECTION

PATENT NO. : 5,794,113
DATED : August 11, 1998
INVENTOR(S) : Zuhair Abdul Razak Munir, In-Jin Shon and Kazuo Yamazaki

It is certified that error appears in the above-indentified patent and that said Letters Patent is hereby corrected as shown below:

| COLUMN | LINE | |
|---|---|---|
| 1 | 29 | after "S", insert -- . -- |
|   | 37 | after "430", delete " ." |
| 7 | 9 | change "ration" to -- ratio -- |
| 8 | 53 | change "Expenmental" to -- Experimental -- |
| 10 | 23 | change "suicides" to -- silicides -- |

Signed and Sealed this

Sixteenth Day of February, 1999

Attest:

Attesting Officer

Acting Commissioner of Patents and Trademarks